(12) United States Patent
Cusell et al.

(10) Patent No.: US 8,502,117 B2
(45) Date of Patent: Aug. 6, 2013

(54) OVEN WITH EXTERNAL COOLING, AND USE THEREOF

(76) Inventors: Leonard Emanuel Cusell, Westbroek (NL); Nicolaas Johannes Van Zwieten, Ravenswaaij (NL)

( * ) Notice: Subject to any disclaimer, the term of this patent is extended or adjusted under 35 U.S.C. 154(b) by 435 days.

(21) Appl. No.: 12/755,207

(22) Filed: Apr. 6, 2010

(65) Prior Publication Data

US 2010/0258549 A1    Oct. 14, 2010

(51) Int. Cl.
*A21B 1/40*    (2006.01)

(52) U.S. Cl.
USPC ............ 219/400; 219/405; 219/430; 219/632

(58) Field of Classification Search
USPC .................. 219/400, 402, 405, 430, 618, 632
See application file for complete search history.

(56) References Cited

U.S. PATENT DOCUMENTS

| | | | | |
|---|---|---|---|---|
| 3,633,561 | A | * | 1/1972 | Barnett et al. .............. 126/21 R |
| 5,107,821 | A | * | 4/1992 | von Blanquet .............. 126/19 R |
| 2005/0127070 | A1 | * | 6/2005 | Kang ............................. 219/757 |
| 2007/0125760 | A1 | * | 6/2007 | Kim et al. ..................... 219/391 |
| 2008/0185373 | A1 | * | 8/2008 | Elkasevic et al. ............. 219/394 |
| 2009/0178579 | A1 | * | 7/2009 | Heiser et al. ................ 99/421 H |

* cited by examiner

*Primary Examiner* — Alexander Ghyka
(74) *Attorney, Agent, or Firm* — David R. Heckadon; Gordon Rees LLP

(57) ABSTRACT

The invention relates to a method for preparing food, particularly in an aircraft, comprising of placing the food in a preparation space of an oven and heating the preparation space, wherein the outer side of the oven is cooled during the preparation. Cooling air can be forced for this purpose along the outer surface of the oven. This cooling air can also be forced through the oven, along the electronics present therein.

The invention further relates to an oven, in particular for use in an aircraft, comprising a preparation space and means for heating the preparation space, and means for cooling the outer side of the oven. These cooling means can be adapted to force cooling air along the outer surface of the oven, and can in addition be adapted to force the cooling air through or along an electronics compartment in the oven.

15 Claims, 3 Drawing Sheets

OVEN WITH EXTERNAL COOLING, AND USE THEREOF

CROSS REFERENCE TO RELATED APPLICATION

This application claims priority from Netherlands patent Application Ser. No. 1036845 filed Apr. 10, 2009.

TECHNICAL FIELD

The invention relates to a method for preparing food, particularly in an aircraft, comprising of placing the food in a preparation space of an oven and heating the preparation space. Such a method is generally known.

BACKGROUND OF THE INVENTION

A problem that occurs in the preparation of food in ovens is that, due to the heating of the preparation space, the outer side of the oven also heats up. This can result in danger to users and damage in the vicinity of the oven. This heating is a particular problem in the case of ovens which are used intensively, such as ovens in aircraft. In aircraft food has a major effect on the way in which a passenger perceives a journey. It is therefore of great importance for airlines to be able to provide all passengers with a meal on time during a flight. This involves ovens in aircraft having to have a high capacity and being capable of intensive use.

An additional problem with aircraft ovens is that they must satisfy diverse requirements in respect of safety, while the users also demand that these ovens take up the least possible space and weigh as little as possible, so that the unladen weight of the aircraft does not become too high. International standards and regulations, for instance the ARINC standard, apply in respect of the mounting and connection of ovens in aircraft. These lay down, among other requirements, the overall dimensions of ovens, as well as the maximum allowable temperature on the outside of an oven. Because space is scarce in aircraft, manufacturers strive to make the overall space for ovens and other equipment as small as possible. If the outer temperature of the oven is then relatively high, damage to the surrounding construction occurs quite quickly.

The invention now has for its object to solve this problem. This is achieved in a method as described in the preamble in that the outer side of the oven is cooled during the preparation. By cooling the outer side the temperature in the immediate vicinity of the oven can be limited without additional insulation material having to be arranged for this purpose around the preparation space. Such insulation material would after all make the oven heavier and take up space.

Cooling can be realized in simple manner when cooling air is forced along at least one outer surface of the oven. Air cooling does after all require fewer structural provisions than liquid cooling.

A very efficient cooling is obtained when the cooling air is also forced through the oven. Two functions, internal cooling and external cooling, can thus be combined with each other.

The cooling air is here advantageously forced along electronics in the oven. For cooling of the control electronics, which are usually situated above the hot preparation space, about the same amount of cooling air is required as for cooling the outer side of the oven.

Since the electronics require somewhat more cooling than the outer side, it is recommended that the cooling air is forced first through the oven and then along the at least one outer surface.

This can be realized in structurally simple manner when the cooling air is drawn in on the front side of the oven and blown out on the rear side, and the blown-out cooling air is guided along the at least one outer surface back to the front side.

The invention also relates to an oven with which the above described method can be applied. A conventional aircraft oven comprises a preparation space and means for heating the preparation space. An aircraft oven according to the invention is distinguished herefrom by means for cooling the outer side of the oven.

For the reasons stated above the cooling means can be adapted to force cooling air along at least one outer surface of the oven. In addition, the cooling means can be adapted to force the cooling air through the oven, in particular through or along an electronics compartment. The cooling means can further be adapted to force the cooling air first through the oven and then along the at least one outer surface.

In a preferred embodiment of the oven according to the invention the cooling means comprise at least one suction opening, at least one cooling fan arranged in the oven and at least one blow-out opening, and means arranged downstream of the blow-out opening for the purpose of guiding the blown-out cooling air along the at least one outer surface. The suction opening can here advantageously be formed in or close to the front side of the oven and the blow-out opening in or close to the rear side thereof, and the guide means can be adapted to guide the blown-out cooling air back along the outer surface to the front side.

A structurally simple embodiment of the oven is realized when the guide means comprise at least one channel running from the blow-out opening to a side part of the oven. The blown-out cooling air can be guided easily and with minimum flow losses through such a channel to the side of the oven for cooling.

The guide means preferably comprise two channels extending from the blow-out opening to both sides of the oven. The warmest part of the periphery of the oven can thus be cooled in its entirety. It must be taken into account here that the top side of the oven, which is separated from the preparation space by the cooled electronics compartment, becomes less warm.

In order to distribute the cooling air over the whole height of the side walls and moreover prevent it being blown out with too great a force on the front side adjacently of the oven, the or each channel preferably has a section increasing from the blow-out opening toward the side of the oven.

A structurally simple embodiment of the oven is realized when the or each channel is defined by a plate extending substantially parallel to the rear side of the oven and having a bent end part at the position of an edge between the rear side and the side part.

The invention will now be elucidated on the basis of an example, wherein reference is made to the accompanying drawing, in which:

DETAILED DESCRIPTION OF THE DRAWINGS

Figure 1:
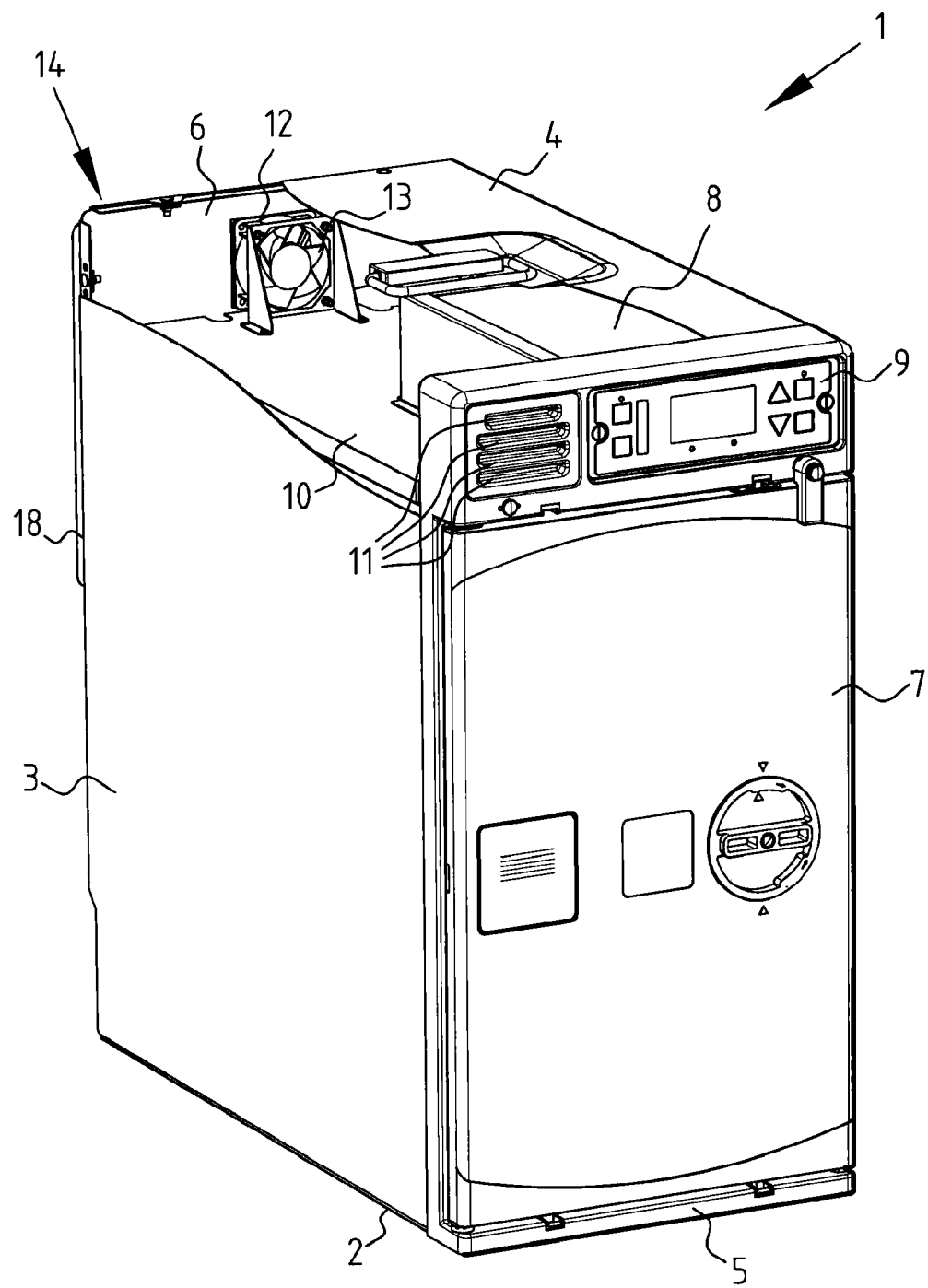
FIG. 1 shows a partly cut-away perspective front view of an oven according to the invention.
Figure 2:
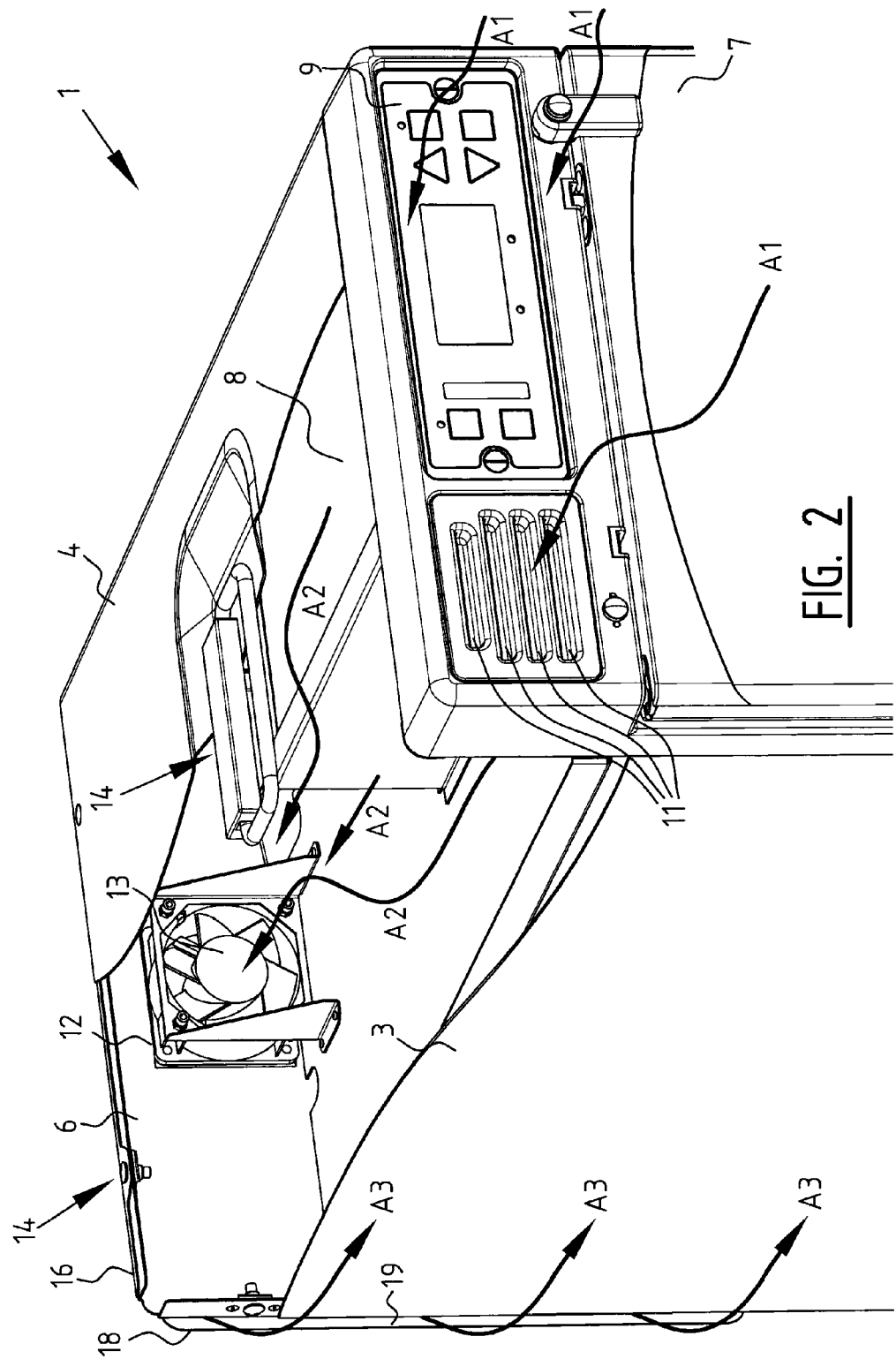
FIG. 2 shows a detail view on larger scale of the upper part of the oven of FIG. 1, in which the flow of the cooling air is indicated.
Figure 3:
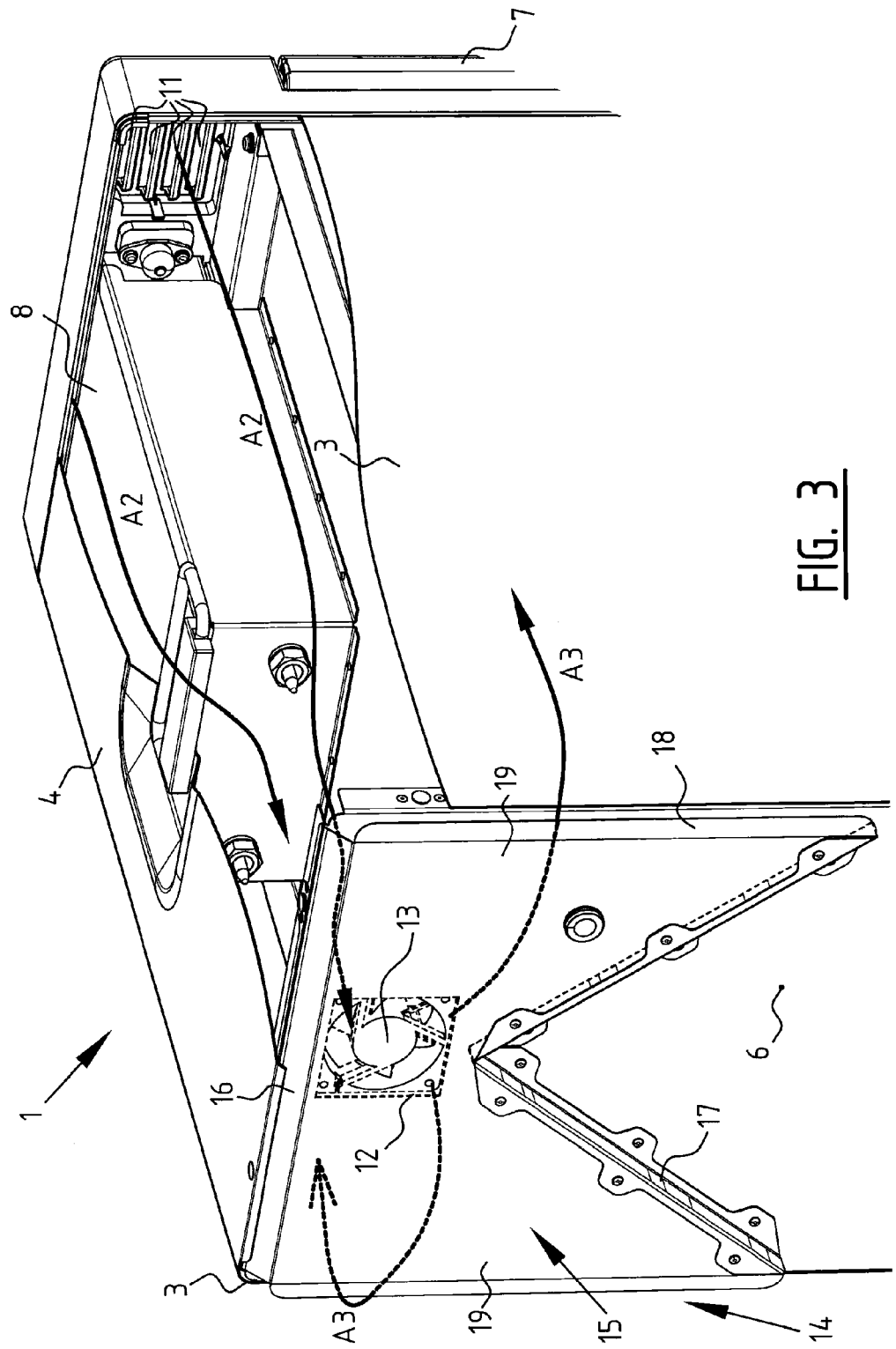
FIG. 3 is a perspective rear view of the part of the oven shown in FIG. 2.

An oven 1 for use in an aircraft comprises a housing formed by a bottom 2, two side walls 3, an upper wall 4, a front wall 5 and a rear wall 6. Formed in the housing is a preparation space (not shown here) in which food can be prepared by being heated. The preparation space is accessible through a door 7 which forms the greater part of front wall 5. In addition, oven 1 has means for heating the preparation space, likewise not shown here. These heating means can comprise one or more spiral filaments and a steam generator. Food is often prepared in aircraft by being steamed.

Situated in the upper part of the housing is a compartment 8 in which are accommodated electronics for controlling oven 1. This compartment 8 is closed at the front by a control panel 9. The electronics compartment 8 is separated from the preparation space by an insulated intermediate wall 10. Compartment 8 is cooled in order to protect the electronics from overheating. Formed for this purpose in front wall 5, adjacently of, above and below control panel 9, are a number of suction openings 11 through which cool ambient air can be drawn in as according to arrows A1. Formed in rear wall 6 is a blow-out opening 12 through which the air can be blown out of the housing again. The circulation of the cooling air through the housing along and over electronics compartment 8 (arrows A2) is maintained by a fan 13 arranged in front of blow-out opening 12.

According to the invention the cooling air leaving the housing through blow-out opening 12 is now used to cool the outer side of oven 1. While this air has absorbed heat from the housing, and is therefore warmer than the ambient air, it is still cooler than the outer side, in particular side walls 3 of oven 1. The used, blown-out cooling air has for instance a temperature of about 60° C., but still has sufficient cooling power to reduce the temperature of side walls 3 by about 15 to 20° C.

Oven 1 is thus provided according to the invention with cooling means 14 for cooling the outer side which in the shown example comprise a guide member 15, whereby the cooling air, after leaving the blow-out opening 12, is guided along side walls 3 of oven 1 back to the front side. This guide member 15 takes the form of a plate fixed some distance from rear wall 6 of oven 1. Guide plate 15 is connected along its upper edge 16 to upper wall 4, while its bottom edge is connected to rear wall 6 of oven 1 by means of a fixing profile 17.

Side edges 18 of the plate-like guide member 15 are open, so that this member 15, together with rear wall 6, defines two channels 19 running from the centrally placed blow-out opening 12 to side walls 3. The bottom edge of guide plate 15 and fixing profile 17 have a reverse V-shape, whereby each channel 19 has a section which increases in the direction of the associated side wall 3. Side edges 18 of guide plate 15 are bent, whereby the outflowing cooling air is deflected and flows along side walls 3 as according to arrows A3. This deflection is caused partly by the wall (not shown here) of the space in which oven 1 is installed and which is situated a small distance from side wall 3. Owing to the cooling of side wall 3 the distance to the wall of the surrounding construction can remain limited to for instance about 12.7 mm (½ inch).

The invention thus makes it possible with relatively simple and light provisions to install an oven for intensive use in a relatively small space without for instance additional insulation material having to be added or other fundamental structural measures being necessary for this purpose.

Although the invention is elucidated above on the basis of an example, it will be apparent that it is not limited thereto but can be varied in many ways. The flow direction of the cooling air could for instance be reversed by drawing in the air along the side walls and then guiding it into the housing. It is also possible to envisage the cooling of the outer side of the oven being provided wholly independently of the internal cooling.

In addition, the many structural and functional details of the shown and described embodiment can be modified without departing from the inventive concept forming the basis thereof.

The scope of the invention is therefore defined solely by the following claims.

What is claimed is:

1. A method for preparing food, particularly in an aircraft, comprising of placing the food in a preparation space of an oven and heating the preparation space, drawing cooling air into the oven, and then forcing the cooling air out of the oven, and then forcing the cooling air across an outer side of the oven such that the outer side of the oven is cooled during the preparation.

2. The method as claimed in claim 1, wherein the cooling air is forced along electronics in the oven.

3. The method as claimed in claim 1, wherein the cooling air is drawn in on the front side of the oven and blown out on the rear side, and the blown-out cooling air is guided along the at least one outer surface back to the front side.

4. An oven, in particular for use in an aircraft, comprising a preparation space and means for heating the preparation space, characterized by means for cooling the outer side of the oven comprising means for drawing cooling air into the oven, and then forcing the cooling air out of the oven, and then forcing the cooling air across an outer side of the oven.

5. The oven as claimed in claim 4, wherein the cooling means are adapted to force the cooling air through or along an electronics compartment in the oven.

6. The oven as claimed in claim 4, wherein the cooling means comprise at least one suction opening, at least one cooling fan arranged in the oven and at least one blow-out opening, and means arranged downstream of the blow-out opening for the purpose of guiding the blown-out cooling air along the at least one outer surface.

7. The oven as claimed in claim 6, wherein the suction opening is formed in or close to the front side of the oven and the blow-out opening in or close to the rear side thereof, and the guide means are adapted to guide the blown-out cooling air back along the outer surface to the front side.

8. The oven as claimed in claim 7, wherein the guide means comprise at least one channel running from the blow-out opening to a side part of the oven.

9. The oven as claimed in claim 8, wherein the guide means comprise two channels extending from the blow-out opening to both sides of the oven.

10. The oven as claimed in claim 8, wherein the or each channel has a section increasing from the blow-out opening toward the side of the oven.

11. The oven as claimed in any of the claim 8, wherein the or each channel is defined by a plate extending substantially parallel to the rear side of the oven and having a bent end part at the position of an edge between the rear side and the side part.

12. The method of claim 1, wherein the cooling air is forced out of the back of the oven and then passes along a rear wall and at least one side wall of the oven.

13. The method of claim 12, wherein the cooling air that is forced out of the back of the oven is divided into two flows passing in opposite directions along the back of the oven and then each flow passes along an opposite side wall of the oven.

14. The method of claim 4, wherein the cooling air is forced out of the back of the oven and then passes along a rear wall and at least one side wall of the oven.

15. The method of claim 14, wherein the cooling air that is forced out of the back of the oven is divided into two flows passing in opposite directions along the back of the oven and then each flow passes along an opposite side wall of the oven.

* * * * *